(12) United States Patent
Li

(10) Patent No.: US 11,997,191 B2
(45) Date of Patent: May 28, 2024

(54) SYSTEM AND METHOD FOR PROTECTING SECRET DATA ITEMS USING MULTIPLE TIERS OF ENCRYPTION AND SECURE ELEMENT

(71) Applicant: Blue Space Information Technology Co., Ltd.

(72) Inventor: Wei Li, Guangzhou (CN)

(73) Assignee: Blue Space Information Technology Co., Ltd., Guangdong (CN)

( * ) Notice: Subject to any disclaimer, the term of this patent is extended or adjusted under 35 U.S.C. 154(b) by 280 days.

(21) Appl. No.: 17/701,792

(22) Filed: Mar. 23, 2022

(65) Prior Publication Data
US 2023/0327855 A1    Oct. 12, 2023

(51) Int. Cl.
H04L 9/08    (2006.01)
H04L 9/14    (2006.01)

(52) U.S. Cl.
CPC .......... H04L 9/0822 (2013.01); H04L 9/0863 (2013.01); H04L 9/14 (2013.01)

(58) Field of Classification Search
CPC ....... H04L 9/0822; H04L 9/0863; H04L 9/14; H04L 9/0877
See application file for complete search history.

(56) References Cited

U.S. PATENT DOCUMENTS

| 11,716,312 B1* | 8/2023 | McNamara, Jr. ....... G06F 21/46 726/6 |
| 2017/0075825 A1* | 3/2017 | Chen ................... H04L 63/0428 |
| 2022/0329422 A1* | 10/2022 | Lin ......................... H04L 9/50 |

OTHER PUBLICATIONS

"Decrypt passwords/cookies/history/bookmarks from the browser", GitHub, Inc., https://github.com/moonD4rk/HackBrowserData.

* cited by examiner

Primary Examiner — Abiy Getachew
(74) Attorney, Agent, or Firm — The Law Offices of Konrad Sherinian, LLC; Depeng Bi

(57) ABSTRACT

A system and method for protecting secret data items using multiple layers of encryption with multiple encryption keys, a Secure Element, and a sandbox on an electronic device includes a secret data item manager. The secret data item manager encrypts secret data items using a hardware encryption key and the Secure Element. It encrypts the transient secret cipher data with an account encryption key to generate and store repository account cipher data. It further encrypts the account encryption key to generate and store the repository account key cipher data with a root encryption key. The manager also derives a secondary encryption key from a user account password, encrypts the root encryption key with the secondary key to generate the transient root encryption key, encrypts the transient root encryption key using the hardware key to generate the repository root encryption key cipher data, and stores repository root encryption key cipher data.

12 Claims, 6 Drawing Sheets

SYSTEM AND METHOD FOR PROTECTING SECRET DATA ITEMS USING MULTIPLE TIERS OF ENCRYPTION AND SECURE ELEMENT

CROSS REFERENCE TO RELATED APPLICATIONS

NONE.

FIELD OF THE DISCLOSURE

The present invention generally relates to confidential electronic data protection, and more particularly relates to a system and method for protecting confidential data on an electronic device. More particularly still, the present disclosure relates to a system and method for protecting secret data items using a secure element on an electronic device and multiple tiers of encryption.

DESCRIPTION OF BACKGROUND

In the digital age, the protection of secret data items, such as personal passwords, passcodes, pin numbers, financial account access codes, time-based one-time passwords (TOTP), etc., is paramount important for individuals and organizations against online theft and attack. Utilities, like password managers, have been proposed to help users to manage and protect secret data items along with other general data items, such as Uniform Resource Locators (URLs), online account login names, online account Email addresses, phone numbers, notes, etc.

Conventional password managers use a user configured password to encrypt secret data items and general data items. When an online hacker steals the password and the database of the encrypted data, the hacker is then able to steal all secret data items, and general data items if included in the encrypted database. Conventional password manager software programs generally expose numerous attack surfaces. For example, some users use a same password with multiple online service accounts. In such a case, the loss of the same password (also referred to herein as a master password) by one service provider exposes security danger for all other service accounts. As another example, a keyboard input hook program or otherwise insecure input system could be used to steal the master password and thus the encrypted secret data items. As yet another example, when a conventional password manager decrypts the encrypted database using the master password entered by a user, a computer software program from an online hacker could scan data in the computer's memory to steal the secret data items and even the general data items. As still another example, conventional password managers store the encrypted database in storage or memory external to the conventional password manager software programs (or applications). In such a case, the encrypted database can easily be read by a hacking computer program.

One well known encryption technology is Advanced Encryption Standard (AES). It is a technical specification for the encryption and decryption of electronic data established by the U.S. National Institute of Standards and Technology (NIST) in 2001. The AES encryption technology is further shown in FIG. 3. Under the AES architecture, a cipher implements one or more encryption and decryption algorithms. It encrypts a block of unencrypted plain data using a secret key (such as a 128-bit cryptographic key, a 192-bit cryptographic key or a 256-bit cryptographic key) to generate a block of cipher data, i.e., the encrypted output of the cipher.

One type of conventional password managers is integrated with a web browser. The encrypted databases are then stored on the running computing devices' (such as a desktop computer, a laptop computer, a tablet computer, a smartphone, etc.) storage devices (such as a hard disk, a memory, etc.). This type of password managers is known to be vulnerable for being hacked or otherwise decrypted by malicious entities. Another type of password managers are independent computer software applications, such as KeePass Password Safe and Password Safe computer software applications.

Secure Element (SE) is another conventional endeavor to protect secret data items. An SE is a microprocessor chip for prohibiting unauthorized access and storing secret data items, such as confidential and cryptographic data. It has been utilized in smartphones, tablet computers, hardware crypto wallets, and other electronic devices. As shown in FIG. 4, a Secure Element uses an encryption key to encrypt plain text (i.e., unencrypted data) into cipher text (i.e., encrypted data) within the hardware chip. Secure Element is slow in encrypting and decrypting data. When there are a big number of accounts with secret data items to be protected by a Secure Element, the performance is even worse. Another conventional endeavor is a sand box provided by Android, IOS and other operating systems. Each application runs in its own application sandbox on a particular electronic device as shown in FIG. 5. The application 1 cannot access the application data of the application 2, and vice versa.

All the conventional secret data protection means exposes multiple attack surfaces. Accordingly, there is a need a system and method for protecting secret data items that significantly reduces the attack surfaces of protection mechanism. In particular, there is a need for a new system and method for protecting secret data items that uses multiple layers of encryption and a Secure Element on an electronic device. There is a further need for a new system and method for protecting secret data items that uses multiple layers of encryption with multiple encryption keys, a Secure Element, and a sandbox on an electronic device.

SUMMARY OF THE DISCLOSURE

Generally speaking, pursuant to the various embodiments, the present disclosure provides a method protecting secret data items using multiple layers of encryption, multiple encryption keys and a secure microprocessor. The method is performed by a secret data item manager running on an electronic device and includes causing a hardware encryption key generated by the secure microprocessor of the electronic device. The electronic device includes processing unit; some amount of memory operatively coupled to the processing unit; a network interface operatively coupled to the processing unit; a power module operatively coupled to the processing unit for providing electrical power to the electronic device; the secure microprocessor operatively coupled to the processing unit; an operating system running on the processing unit; and the secret data item manager adapted to be managed by the operating system and be executed by the processing unit. The method further includes generating a root encryption key; retrieving a set of secret data items; retrieving a collection of general account data items; creating an account encryption key for a user account; using the hardware encryption key, encrypting the set of secret data items to generate transient secret cipher data; using the account encryption key, encrypting the transient secret cipher data and the collection of general account data items together to generate repository account cipher data; storing the repository account cipher data; using the root encryption key, encrypting the account encryption key to generate repository account key cipher data; storing repository account key cipher data; using a key derivation function, deriving a secondary encryption key from a password for the user account; using the secondary encryption key, encrypting the root encryption key to generate transient root encryption key cipher data; using the hardware encryption key, encrypting the transient root encryption key cipher data to generate repository root encryption key cipher data; and storing repository root encryption key cipher data. In one implementation, the secure microprocessor is a Secure Element of the electronic device. At least one of the hardware encryption key, the root encryption key, the account encryption key, and the secondary encryption key is a symmetric encryption key (such as an AES 128-bit key, an AES 192-bit key, an AES 256-bit key, or a Chacha20 key) or an asymmetric encryption key pair (such as a RSA key pair or an Elliptic-curve cryptography key pair). The transient secret cipher data is not stored. The transient root encryption key cipher data is not stored. The key derivation function is a Password-Based Key Derivation Function 2 function, an Argon2 function, or a different key derivation function. The operating system is an Android operating system or an iOS operating system. The set of secret data items includes at least one of a password, a passcode, a time-based one-time password, and a recovery key.

Further in accordance with the present teachings is a secret data item manager for protecting secret data items using multiple layers of encryption, multiple encryption keys and a secure microprocessor. The secret data item manager is implemented as a computer software application. Furthermore, the secret data item manager is adapted to cause a hardware encryption key generated by the secure microprocessor of an electronic device. The electronic device includes processing unit; some amount of memory operatively coupled to the processing unit; a network interface operatively coupled to the processing unit; a power module operatively coupled to the processing unit for providing electrical power to the electronic device; the secure microprocessor operatively coupled to the processing unit; an operating system running on the processing unit; and the secret data item manager adapted to be managed by the operating system and be executed by the processing unit. The secret data item manager is further adapted to generate a root encryption key; retrieve a set of secret data items; retrieve a collection of general account data items; create an account encryption key for a user account; using the hardware encryption key, encrypt the set of secret data items to generate transient secret cipher data; using the account encryption key, encrypt the transient secret cipher data and the collection of general account data items together to generate repository account cipher data; store the repository account cipher data; using the root encryption key, encrypt the account encryption key to generate repository account key cipher data; store repository account key cipher data; using a key derivation function, derive a secondary encryption key from a password for the user account; using the secondary encryption key, encrypt the root encryption key to generate transient root encryption key cipher data; using the hardware encryption key, encrypt the transient root encryption key cipher data to generate repository root encryption key cipher data; and store repository root encryption key cipher data. In one implementation, the secure microprocessor is a Secure Element of the electronic device. At least one of the hardware encryption key, the root encryption key, the account encryption key, and the secondary encryption key is a symmetric encryption key (such as an AES 128-bit key, an AES 192-bit key, an AES 256-bit key, or a Chacha20 key) or an asymmetric encryption key pair (such as a RSA key pair or an Elliptic-curve cryptography key pair). The transient secret cipher data is not stored. The transient root encryption key cipher data is not stored. The key derivation function is a Password-Based Key Derivation Function 2 function, an Argon2 function, or a different key derivation function. The operating system is an Android operating system or an iOS operating system. The set of secret data items includes at least one of a password, a passcode, a time-based one-time password, and a recovery key.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
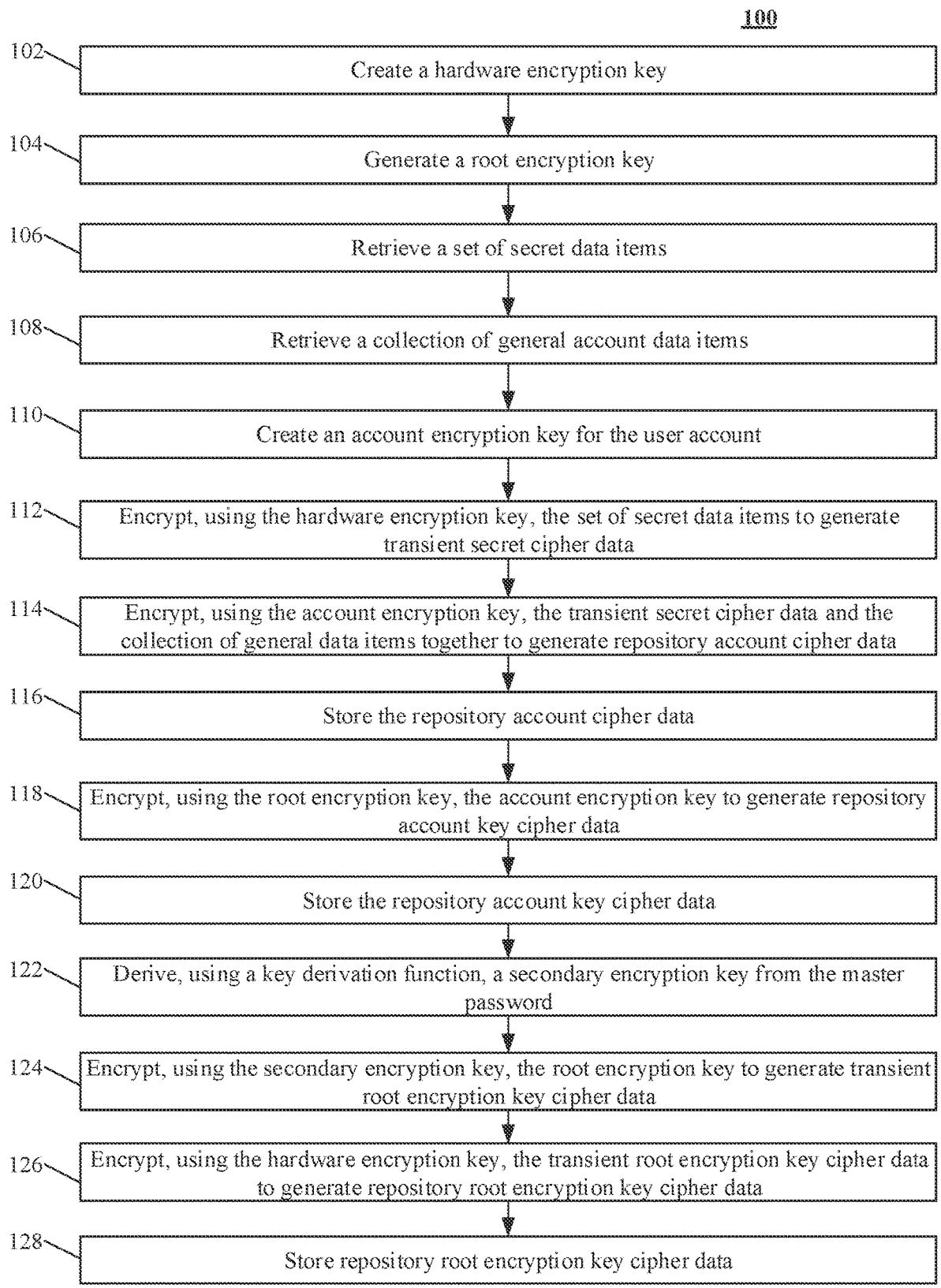
FIG. 1 is a flowchart illustrating a process by which a secret data item manager running on an electronic device protects secret data items using multiple layers of encryption and multiple encryption keys in accordance with this disclosure.

Turning to the Figures and to FIG. 1 in particular, a flowchart illustrating a method for protecting secret data items using multiple layers of encryption and a secure microprocessor (such as a Secure Element) on an electronic device is shown and generally indicated at 100. The new method 100 is performed by a secret data item manager running on an electronic device, such as a smartphone, a tablet computer, a laptop computer or a desktop computer. The secret data item manager is a specialized computer software application, programmed using computer programming languages (such as C, C++, Java, etc.). The secret data item manager and the electronic device are further shown in FIG. 2.

Figure 2:
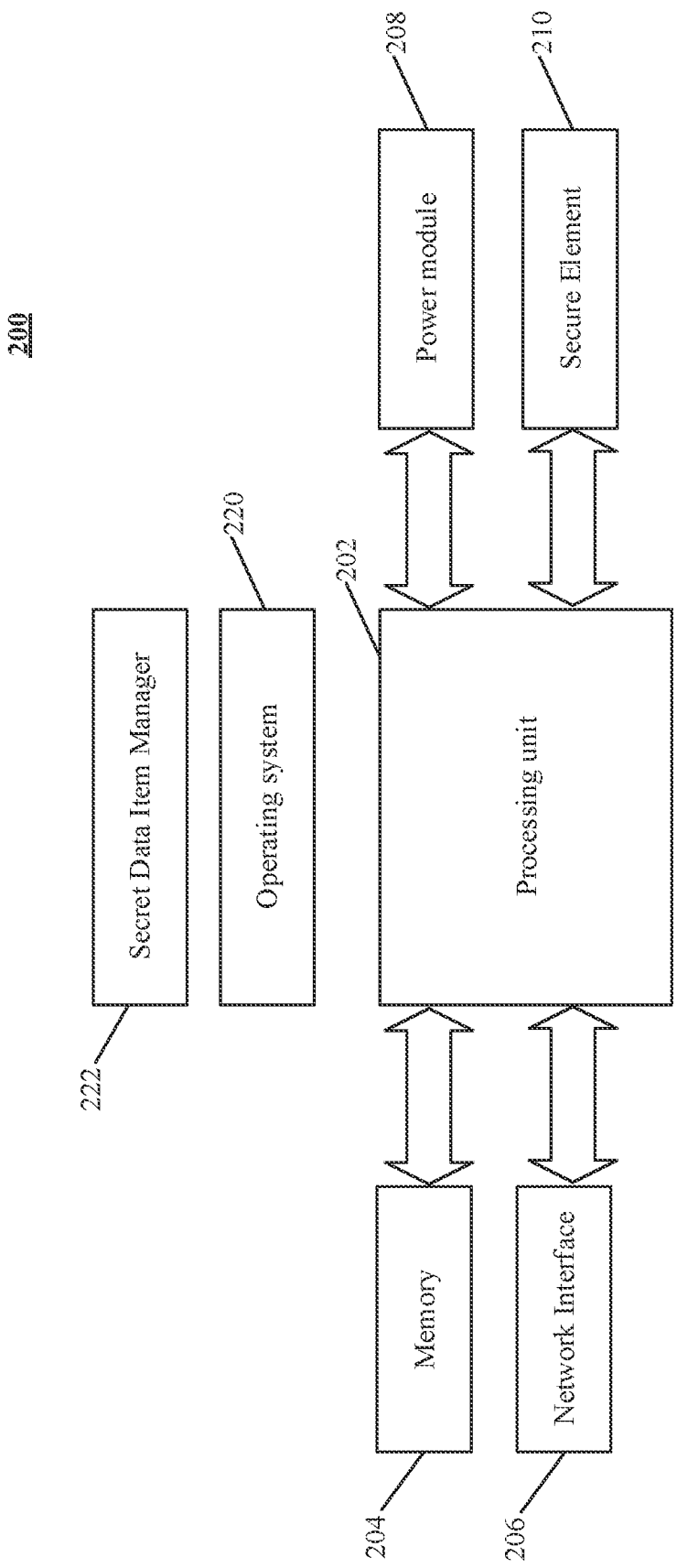
FIG. 2 is a block diagram of an electronic device for protecting secret data items using multiple layers of encryption and a Secure Element in accordance with this disclosure.
Figure 3:
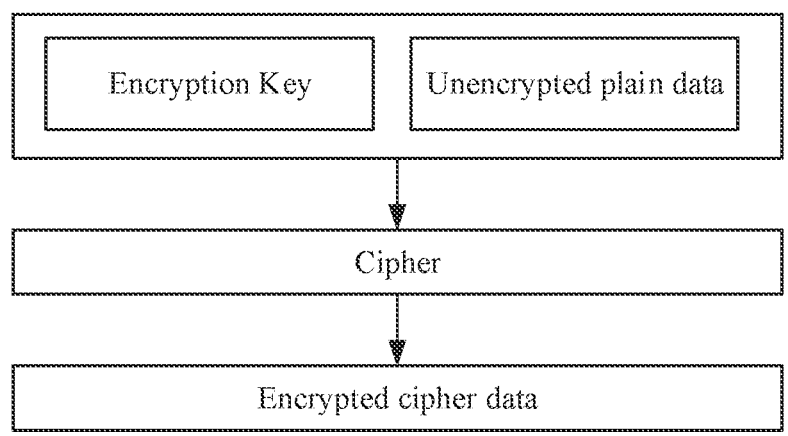
FIG. 3 is a block diagram illustrating the AES encryption framework.
Figure 4:
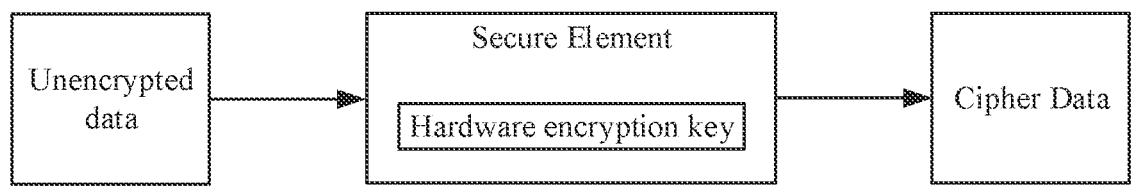
FIG. 4 is a block diagram illustrating the Secure Element encryption technology.
Figure 5:
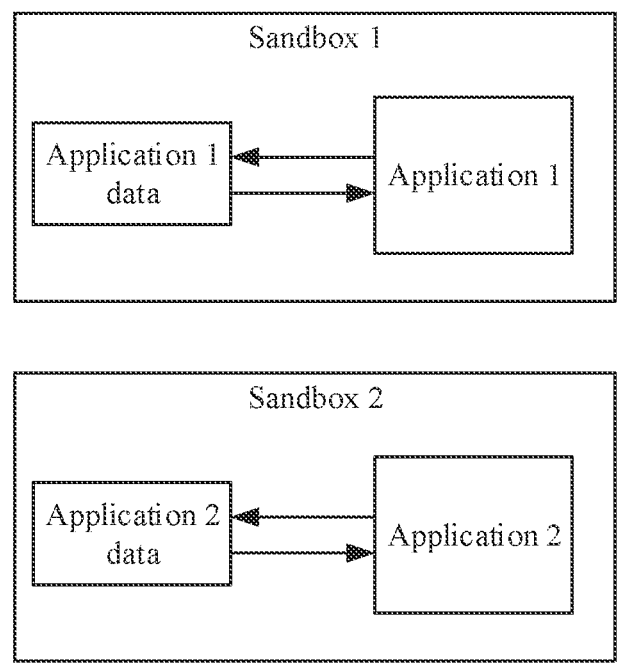
FIG. 5 is a block diagram illustrating the sandbox protection of computer software applications.

Referring now to FIG. 2, a simplified block diagram of the illustrative electronic device with the new secret data item manager is shown and generally indicated at 200. The electronic device 200 includes at least a processing unit (such as a central processing unit (CPU)) 202, some amount of memory 204 operatively coupled to the processing unit 202, a network interface 206 operatively coupled to the processing unit 202, a power module 208 operatively coupled to the processing unit 202 for providing electrical power to the device 200, and a Secure Element 210 operatively coupled to the processing unit 202. The device 200 also includes an operating system 220 (such as the Android operating system or the iOS operating system) running on the processing unit 202, and the new secret data item manager 222 adapted to be managed by the operating system 220 and executed by the processing unit 202.

Turning back to FIG. 1, at 102, the secret data item manager 222 causes a hardware encryption key generated. In one implementation, the secret data item manager 222 requests a security chip, such as the Secure Element 210, to generate a hardware encryption key, The hardware encryption key is, for example a symmetric encryption key (such as an AES key or a Chacha20 key) or an asymmetric encryption key pair, such as a RSA key pair or an Elliptic-curve cryptography key pair. As used herein, it is also said that the secret data item manager 222 creates the hardware encryption key. At 104, the secret data item manager 222 generates a database master encryption key (also referred herein as a root encryption key). For example, the master encryption key is an AES 128-bit key, an AES 192-bit key or an AES 256-bit key generated by accessing a crypto API or the Secure Element 210 to ensure it is truly random and unguessable.

At 106, the secret data item manager 222 retrieves a set (meaning one or more) of secret data items, such as a password or passcode for an online account, a TOTP secret, a recovery key, etc. The set of secret data items is entered by a user via user input interface (such as a touch screen or a keyboard), and obtained from another data source, either locally or remotely. At 108, the secret data item manager 222 retrieves a collection of general account data items (also referred to herein as a collection of general account data), such as an URL, a username, an Email address, a note, etc. In certain situations, the collection of general account data items may be empty and does not include any general account data. For the illustration of the present teachings, the set of secret data items and the collection of general account data items form all the data to be protected by the secret data item manager 222 for a particular account (also referred to herein as a user account). At 110, the secret data item manager 222 creates an account encryption key for the user account. The account encryption key can be, for example, a 128-bit encryption key, a 192-bit encryption key or a 256-bit encryption key that compatible with the AES framework. The creation of the account encryption key can be accomplished by, for example, accessing a crypto API or the Secure Element 210 to ensure it is truly random and unguessable.

At 112, using the hardware encryption key, the secret data item manager 222 encrypts the set of secret data items to generate transient secret cipher data, including encryption algorithm parameters like AES cipher mode, initial vector. As used herein, transient data is not stored by the secret data item manager 222 after the encryption process 100 is performed. For instance, the transient secret cipher data is generated using an AES encryption algorithm. In one implementation, the secret data item manager 222 causes the security chip 210 of the electronic device 200 to perform the encryption.

At 114, using the account encryption key, the secret data item manager 222 encrypts the collection of general account data items and the transient secret cipher data together to generate repository account cipher data. For instance, the repository account cipher data is generated using an AES encryption algorithm by the secret data item manager 222 itself or calling (or otherwise accessing) a crypto API or the Secure Element 210 to ensure it is truly random and unguessable. As used herein, repository data is stored by the secret data item manager 222 beyond the encryption process shown by elements 102-128 and available for decryption after the elements 102-128. For example, the repository account cipher data is stored in an application data area or memory within a sandbox in the Android or iOS operating system. At 116, the secret data item manager 222 stores the repository account cipher data.

At 118, using the root encryption key, the secret data item manager 222 encrypts the account encryption key to generate repository account key cipher data. For instance, the repository account key cipher data is generated using an AES encryption algorithm by the secret data item manager 222 itself or calling (or otherwise accessing) a crypto API or the Secure Element 210 to ensure it is truly random and unguessable. At 120, the secret data item manager 222 stores the repository account key cipher data.

At 122, using a key derivation function, such as Password-Based Key Derivation Function 2 (PBKDF2) or Argon2, the secret data item manager 222 derives a secondary encryption key from the user's master password for the account. At 124, using the secondary encryption key, the secret data item manager 222 encrypts the root encryption key to generate transient root encryption key cipher data. The transient root encryption key cipher data is also referred to herein as the transient master encryption key cipher data. The transient root encryption key cipher data is not stored. At 126, using the hardware encryption key, the secret data item manager 222 encrypts the transient root encryption key cipher data to generate repository root encryption key cipher data. The repository root encryption key cipher data is also referred herein as the repository master encryption key cipher data. At 128, the secret data item manager 222 stores the repository root encryption key cipher data. In one implementation, the secret data item manager 222 generates repository root encryption key cipher data using the Secure Element 210.

In one embodiment, the secret data item manager 222 protects the set of secret data items by performing the elements 102-120, but not the elements 122-128. In such a case, the user's master password is not used and not required. Though the master password adds an additional layer of protection, it is optional. Even without the master password and the elements 102-120, the process 100 is still more secure than the conventional password managers. In an alternative embodiment, the secret data item manager 222 protects the set of secret data items by performing the elements 102-120 and further protects the root encryption key using the security chip 210 to protect the root encryption key. The alternative embodiment is further illustrated by reference to FIG. 6.

Figure 6:
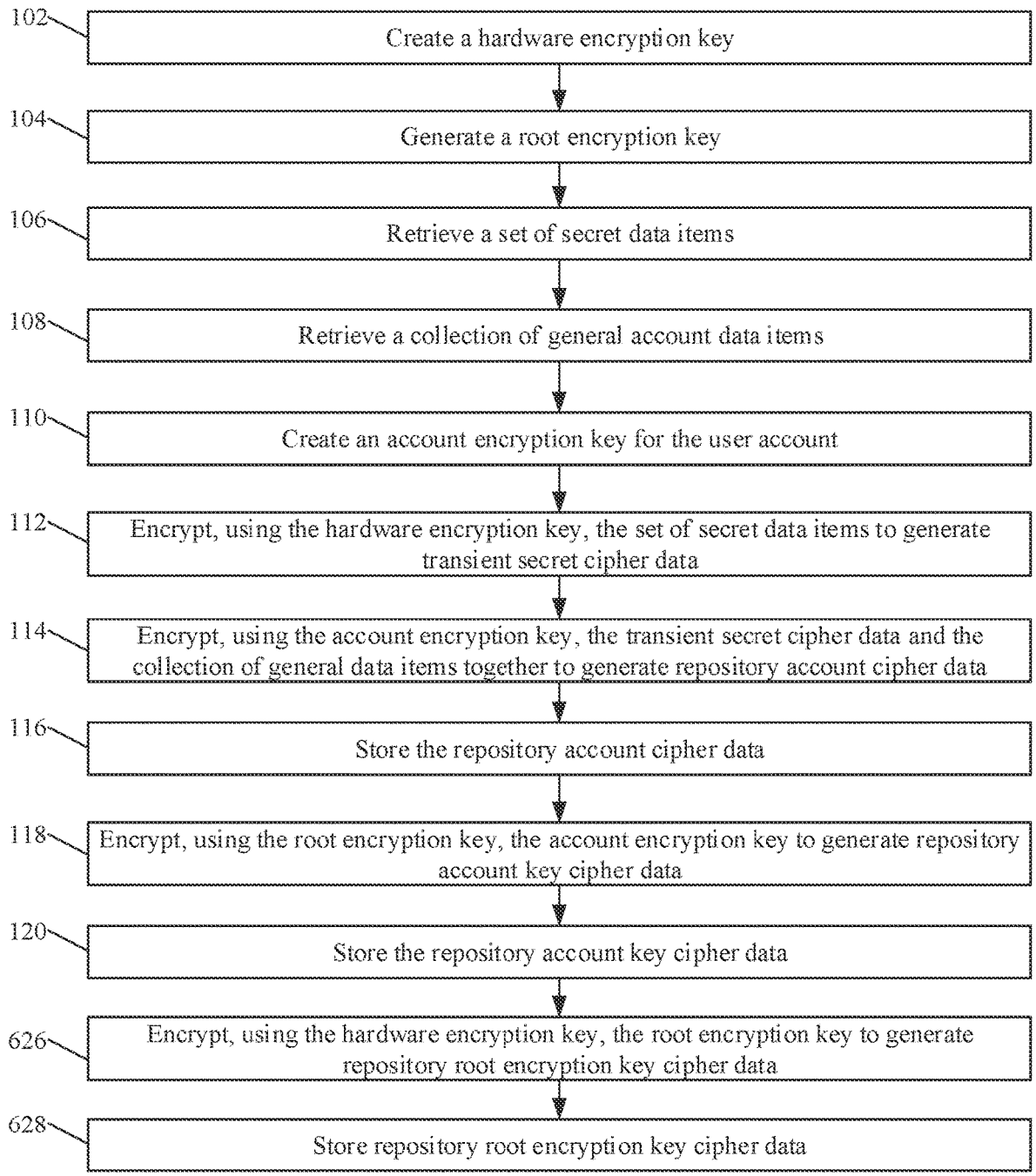
FIG. 6 is a flowchart illustrating a process by which a secret data item manager running on an electronic device protects secret data items using multiple layers of encryption and multiple encryption keys in accordance with this disclosure.

Referring to FIG. 6, a flowchart illustrating a process by which the secret data item manager 222 protects the set of secret data items is shown and generally indicated at 600. The secret data item manager 222 performs the elements 102-120. At 626, the secret data item manager 222, using the hardware encryption key, encrypts the root encryption key to generate repository root encryption key cipher data. At 628, the secret data item manager 222 stores the repository root encryption key cipher data.

To retrieve the secret data items and the collection of general account data items, the secret data item manager 222 decrypts the repository root encryption key cipher data to retrieve the transient root encryption key cipher data. In one implementation, the secret data item manager 222 causes the Secure Element 210 to retrieve the transient root encryption key cipher data. The secret data item manager 222 further derives the secondary encryption key from the user's master password, and uses the secondary encryption key to retrieve the root encryption key by decrypting the transient root encryption key cipher data.

Using the root encryption key, the secret data item manager 222 decrypts the repository account encryption key cipher data to retrieve the account encryption key. Using the account encryption key, the secret data item manager 222 decrypts the repository account cipher data to retrieve the collection of general account data items and the transient secret cipher data. The secret data item manager 222 then decrypts the transient secret cipher data to retrieve the set of secret data items. In one implementation, the decryption is performed by the Secure Element 210.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A method for protecting secret data items using multiple layers of encryption, multiple encryption keys and a secure microprocessor, said method performed by a secret data item manager running on an electronic device and comprising:
    1) Causing a hardware encryption key generated by said secure microprocessor of said electronic device, said electronic device including:
        a) processing unit;
        b) some amount of memory operatively coupled to said processing unit;
        c) a network interface operatively coupled to said processing unit;
        d) a power module operatively coupled to said processing unit for providing electrical power to said electronic device;
        e) said secure microprocessor operatively coupled to said processing unit;
        f) an operating system running on said processing unit, and
        g) said secret data item manager adapted to be managed by said operating system and be executed by said processing unit;
    2) Generating a root encryption key;
    3) Retrieving a set of secret data items;
    4) Retrieving a collection of general account data items;
    5) Creating an account encryption key for a user account;
    6) Using said hardware encryption key, encrypting said set of secret data items to generate transient secret cipher data;
    7) Using said account encryption key, encrypting said transient secret cipher data and said collection of general account data items together to generate repository account cipher data;
    8) Storing said repository account cipher data;
    9) Using said root encryption key, encrypting said account encryption key to generate repository account key cipher data;
    10) Storing repository account key cipher data;
    11) Using a key derivation function, deriving a secondary encryption key from a master password for said user account;
    12) Using said secondary encryption key, encrypting said root encryption key to generate transient root encryption key cipher data;
    13) Using said hardware encryption key, encrypting said transient root encryption key cipher data to generate repository root encryption key cipher data; and
    14) storing repository root encryption key cipher data.

2. The method of claim 1 wherein said secure microprocessor is a Secure Element of said electronic device.

3. The method of claim 2 wherein at least one of said hardware encryption key, said root encryption key, said account encryption key, and said secondary encryption key is a symmetric encryption key or an asymmetric encryption key pair.

4. The method of claim 2 wherein said transient secret cipher data is not stored.

5. The method of claim 2 wherein said transient root encryption key cipher data is not stored.

6. The method of claim 2 wherein said key derivation function is a Password-Based Key Derivation Function 2 function or an Argon2 function.

7. The method of claim 2 wherein said operating system is an Android operating system or an iOS operating system.

8. The method of claim 2 wherein said set of secret data items includes at least one of a password, a passcode, a time-based one-time password, and a recovery key.

9. The method of claim 1 wherein at least one of said hardware encryption key, said root encryption key, said account encryption key, and said secondary encryption key is a symmetric encryption key or an asymmetric encryption key pair.

10. The method of claim 1 wherein said transient secret cipher data is not stored.

11. The method of claim 1 wherein said transient root encryption key cipher data is not stored.

12. The method of claim 1 wherein said set of secret data items includes at least one of a password, a passcode, a time-based one-time password, and a recovery key.

* * * * *